May 2, 1933.  J. M. COFFEY  1,906,541
CONTINUOUS MICA BOARD MAKING MACHINE
Filed June 30, 1928  4 Sheets-Sheet 1
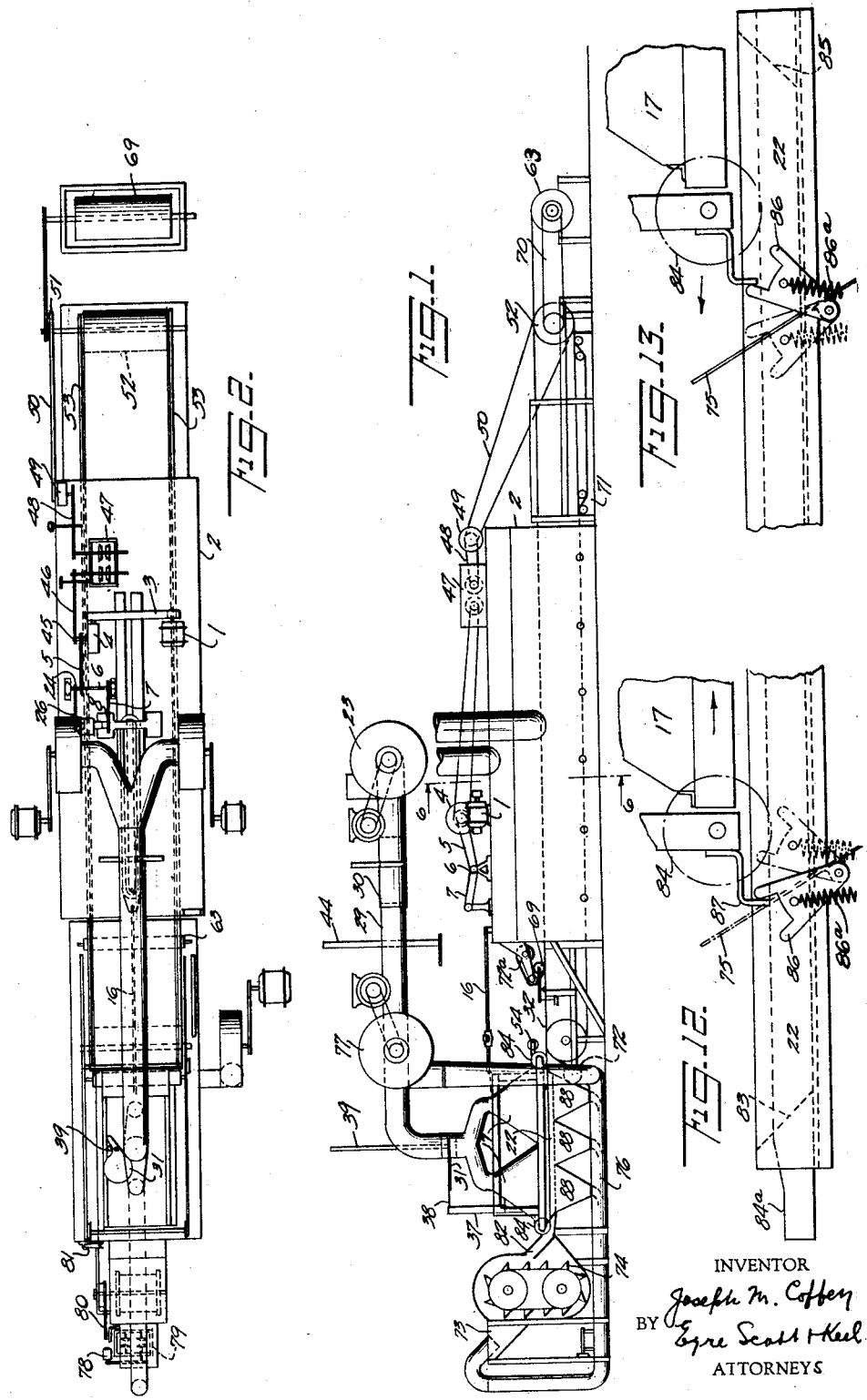
INVENTOR
Joseph M. Coffey
BY Eyre Scott & Keel
ATTORNEYS

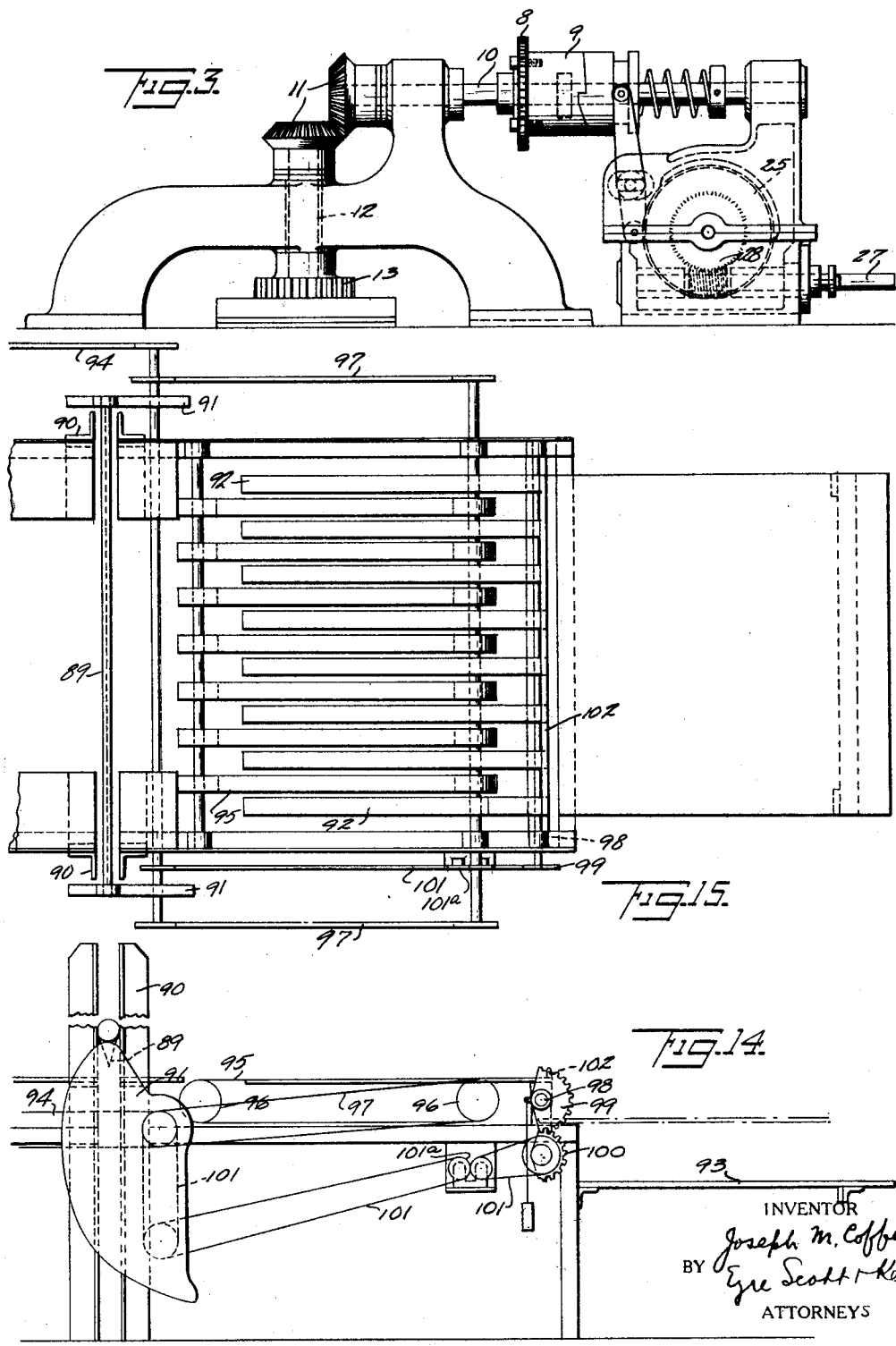

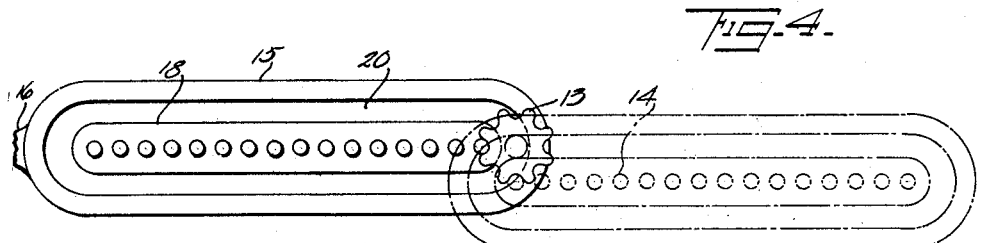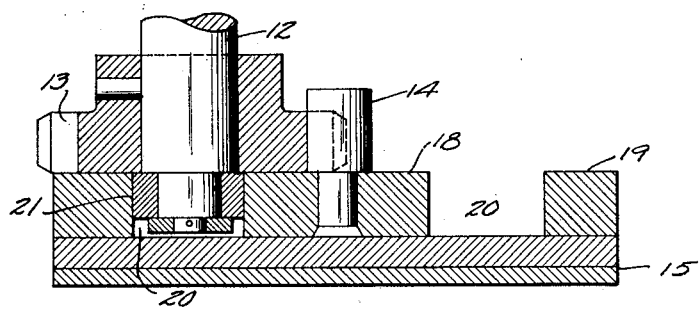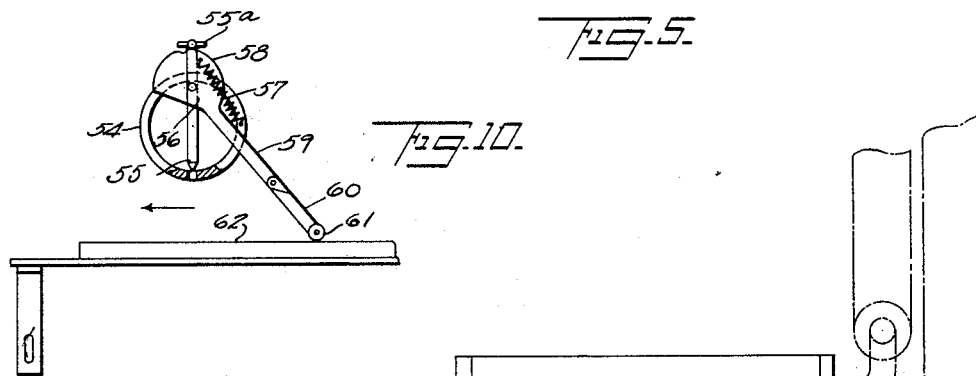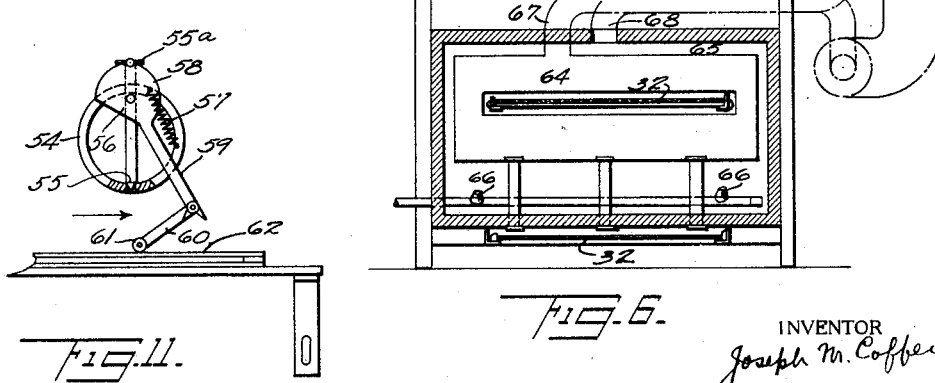

May 2, 1933. J. M. COFFEY 1,906,541
CONTINUOUS MICA BOARD MAKING MACHINE
Filed June 30, 1928 4 Sheets-Sheet 4
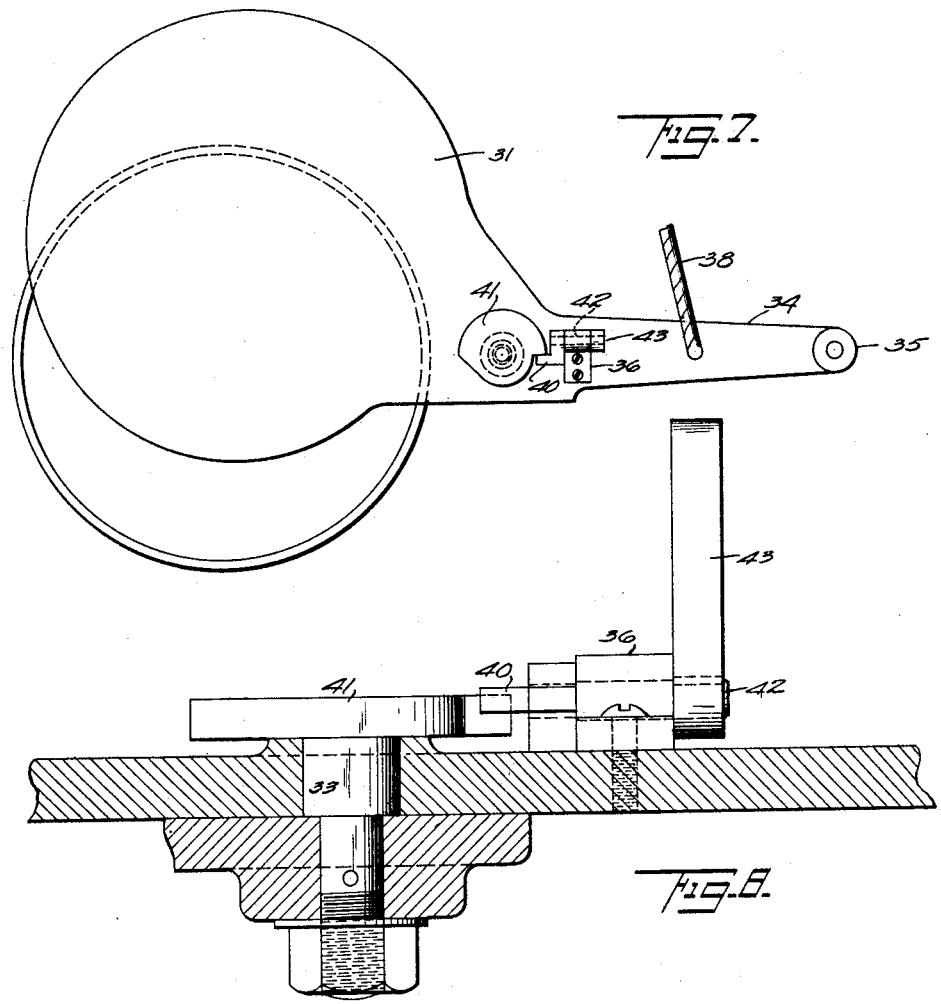
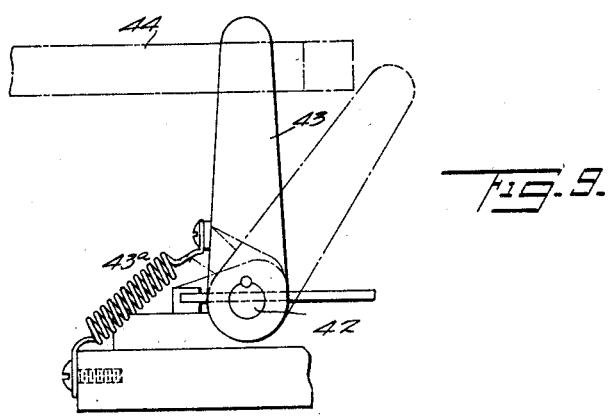
INVENTOR
Joseph M Coffey
BY Eyre Scott Keel
ATTORNEYS Patented May 2, 1933

1,906,541

UNITED STATES PATENT OFFICE

JOSEPH M. COFFEY, OF SCHENECTADY, NEW YORK, ASSIGNOR TO MICA INSULATOR COMPANY, OF NEW YORK, N. Y., A CORPORATION OF NEW JERSEY

CONTINUOUS MICA BOARD MAKING MACHINE

Application filed June 30, 1928. Serial No. 289,530.

My invention is concerned with machines for making mica board and the like. My novel machine is fully automatic, will make boards of a wide range of thickness, that is, of a wide range in the number of mica layers, and operates at a speed much above that of any heretofore known machine designed for the purpose. My machine takes care of the complete manufacture of mica board, that is, it is adapted to receive mica flakes and cementing material at one end and to produce mica board at the other end ready for commercial hardening by heat and pressure in the usual manner. Formerly the most improved machines for making mica board have been only partly automatic, have required the constant attendance of several skilled operators, and have had a very limited range of product. My invention in addition to the machine as a whole, comprises in addition many novel features in the construction and mode of operation of various parts.

Mica board is made of various layers of mica flakes cemented together by means of a binding material such as shellac. Cloth or paper is sometimes used on one or both faces of the completed board as desired. The thickness of the board varies with the number of mica layers superimposed. Due to the necessity of building this board by superimposing layer upon layer, machines have heretofore been able to make only given lengths at one time, or have had to be continually stopped and started and accurately controlled by hand in the timing of the various operations involved. My machine permits of the continuous feeding of mica flakes to one end of the machine with the continuous production of mica board of any desired number of layers from the other end, the machine running continuously with no necessity for manual control at any point. More specifically it comprises a feeding device; a continuously moving endless conveyor; a suction mechanism for lifting the mica flakes from the feeding device and for depositing them upon the conveyor; a cementing device for depositing a layer of binding material over so much of the mica as will be covered by succeeding layers of flakes; an oven through which the conveyor passes for drying the binding material; a winding device for the produced board; and cleaning and drying means for the conveyor after the removal of the board. An arrangement of gears and belts, etc. permits of adjustment of the ratio of the rate of travel of the conveyor to that of the screens and suction apparatus, thus controlling the number of layers in the completed product.

For a better understanding of the various features of novelty of my invention reference should be had to the accompanying drawings in which I have illustrated one form of the complete machine together with a modification of certain parts thereof.

Fig. 1 is a side view of my complete machine;
Fig. 2 is a plan view of the same;
Fig. 3 is a detail of the funnel drive showing the clutch mechanism;
Fig. 4 is a plan view showing the longitudinally reciprocating rack of the funnel drive mechanism;
Fig. 5 is an enlarged transverse section of a portion of the rack and driving means therefor;
Fig. 6 is a transverse-sectional view of the machine taken on the line 6—6 of Fig. 2 showing the oven construction;
Fig. 7 is a detail of the suction control, showing the damper in the partially open position;
Fig. 8 is an enlarged transverse section of a portion of Fig. 7 showing the latch device;
Fig. 9 is a view similar to Fig. 8 but at right angles thereto;
Figs. 10 and 11 illustrate the controlling means for the cementing device;
Figs. 12 and 13 illustrate the damper operating means for the return of excess mica flakes to the feeding device; and Figs. 14 and 15 are cross-sectional and plan views respectively of an alternative arrangement of a part of the machine of Figs. 1 and 2.

Referring first to Figs. 1 and 2, the machine comprises a feeding device 74 associated with a box 22 for receiving mica flakes therefrom, a reciprocating suction mechanism including funnels 17 for lifting the flakes from the box 22, a traveling endless conveyor 32 for receiving the flakes from the suction mechanism, a feeding device 54 for depositing cementing material between the layers of mica, an oven 2 for drying the cement, and a roller 69 upon which the produced board is wound.

The drive for the machine is as follows: Power is supplied from a motor 1, which is mounted on top of the oven casing 2. The motor 1, by means of a belt 3, worm reduction gear 4, and chain 5 drives a counter shaft 6, which, in turn, through a chain 7 drives a sprocket 8 (Fig. 3). The sprocket 8 through a clutch 9 to which it is fastened, drives a horizontal shaft 10 and the shaft 10, through mitre gears 11 drives a vertical shaft 12 carrying a sprocket 13 (Figs. 3, 4 and 5). Sprocket 13 engages with pins 14 on a rack 15 to cause a reciprocating motion of the rack, which in turn through tie rod 16 attached to the rack and to the carriage of funnels 17, causes the funnel carriage to move forward and back at full length of the stroke of rack 15. The reciprocating movement of the rack 15, by means of the unidirectional rotation of sprocket 13 engaging in turn each of the pins 14 will be clear from Fig. 4 in which two positions of the rack are illustrated. The rack 15 comprises the central elongated part 18 carrying the pins 14, and an outer part 19, forming between them a trough 20. On the lower end of vertical shaft 12 is a roller 21 which runs in the trough 20 and thus guides the rack (see Fig. 5). As sprocket 13 rotates, it engages in turn each of pins 14 until the rack is at one or the other extreme of its motion with the sprocket 13 in a horizontal line with the pins 14. The continued rotation of the sprocket engaging with the end pin gives a slight transverse motion to the rack followed by a reversal of its longitudinal motion.

When the rack is in the extreme position shown in full lines in Fig. 4 the funnels 17 are in position over a box 22 into which mica flakes are automatically fed, as will be explained hereinafter. At this extreme position the funnels are held stationary long enough for a layer of mica flakes to be picked up by suction developed within the funnels and held upon a screen (not shown) attached to the bottom of the funnels. To accomplish this period of rest of the funnels, a sprocket 24 (Fig. 2) is mounted on counter shaft 6 to drive a cam 25 (Fig. 3) by means of chain 26, shaft 27 and gears 28. The cam 25 operates to disengage clutch 9 permitting rack 15 to remain idle for the required period of time. Gear reduction 4 is connected positively through countershaft 6 to cam 25 and to sprocket 8 so that the time element is positive in the stationary position of funnels 17. The cam motion and clutch obviate the necessity for stopping and starting the main drive mechanism.

The suction necessary to pick up the mica flakes is developed by a blower 23 exhausting from the pipe 29 leading from the funnels. This pipe is provided with a telescopic joint at 30 suitably packed to prevent leakage. A damper 31 in the pipe 29 controls the suction at the entrance to the funnels. At the position of rest of the funnels, the damper 31 must be open to allow the mica flakes to be lifted to the screen. As the funnels move to the right only sufficient suction to hold the flakes upon the screen is desirable; so that the damper 31, during this movement of the funnels, is but partially open. At the limit of travel of the funnel the damper is closed to permit the flakes to fall from the screen on the conveyor 32. The reduction in suction during the movement of the funnels to the right is desirable both to insure a rapid release of the flakes from the screen upon closure of the damper, and to prevent any picking up of the preceding layer of mica from the conveyor should the screen not be completely covered by the mica layer being carried. Any suitable means for automatically coordinating the control of the damper 31 with the movement of the funnels may be provided. The particular damper controlling means which I have illustrated can best be understood from Figs. 7, 8, and 9, to which reference is now directed. The damper 31 is mounted to turn in a horizontal plane about a pivot 33. An arm 34 of the damper has a roller 35 attached to its extremity and has mounted upon it near the pivotal point of the damper a latch device 36. A weight 37 (see Fig. 1) is attached by means of a cord 38 to the damper arm at a point between the latch device and roller, the weight tending to hold the damper in the closed position. As the funnels approach the extreme left end of their travel, the roller 35 comes into contact with a stop 39 (see Figs. 1 and 2) which opens the damper against the pull of the weight 37. As the funnels move to the right, removing the roller from contact with the stop 39, the weight pulls the arm 34 until a projecting member 40 on the latch 36 comes into contact with a stop 41 which is rigidly attached to the pivot 33. In this position the damper is held in a partly open position such as to permit only suction sufficient to hold the mica flakes against the screen during the travel of the funnels to the right. The projecting member 40 of the latch device 36 is adapted to be rotated by a horizontal shaft 42 to which it is rigidly attached. An upwardly projecting member 43 is likewise rigidly attached to the shaft 42. As the funnels approach their limit of travel the upwardly projecting member 43 of the latch device comes into contact with a fixed stop 44 (see Figs. 1 and 9), which rotates the member 43 against the tension of a spring 43a and thereby lifts the projection 40 releasing it from the stop 41. The damper then closes under the pull of the weight 37 and remains closed during the return travel of the funnels.

The mica flakes, upon closure of the damper, fall from the screen on to the continuously moving conveyor 32. The conveyor is preferably in the form of a spiral perforated belt. The drive for the conveyor is as follows: The worm reduction gear 4, through sprocket 45, (Fig. 2), a chain 46, variable speed transmission 47 and chain 48 drives speed reducer 49. Speed reducer 49, through chain 50, drives sprocket 51, attached to a drum 52. Drum 52 is equipped with two sprockets, one on either side which engage with chains 53 attached to the belt 32 (Fig. 2). The belt is thus made to advance in uniform manner at a speed controlled by the variable speed transmission 47.

To produce varying thicknesses of mica plate it is necessary to superimpose varying numbers of layers of flakes one on the other. By adjusting the speed of belt 32 through the medium of the variable speed transmission 47 the ratio of the speed of the belt to that of the funnel movement is controlled, and thereby the number of superimposed layers of mica is likewise controlled. If, for example, the length of the screen and funnels is 72 inches, and if, during the complete cycle of the motion of the funnels, the belt 32 advances 72 inches, there will be produced a single layer of mica on the belt. If the speed of the belt is reduced to 36 inches during the cycle of the funnels 17, there will be deposited on the belt 32 two overlapping layers of mica. The desired thickness of board can thus be produced by reducing the speed of belt 32 through the medium of the variable speed transmission to superimpose the proper number of layers of mica.

In making mica board it is necessary that the layers of mica flakes should be cemented together by a suitable binder, such as shellac or a suitable synthetic resin. Automatic means for depositing such a binder are provided in my machine. Fixedly mounted on the funnel carriage is a container 54 for the binding material (see Figs. 1, 10 and 11), which is located in a plane parallel to that of the belt 32 with its axis perpendicular to the direction of travel of the belt. It is provided with a series of valve controlled orifices along its lower side. The valves 55 for these orifices are controlled by a lifter 55a operated by a cam 56 and spring 57. The cam 56 is pivotally mounted on the container 54 and comprises a curved portion 58 and an arm 59. The spring 57 is attached at one end to the portion 58 and at the other end to an end wall of the container 54. The portion 58 is shaped to raise valve lifter 55a by rotation against the tension of spring 57. A lever 60 is linked at one end to the arm 59 and at its other end carries a roller 61. Suitably positioned along the framework of the machine is a runway 62 for the roller 61. The arrangement is such that as the funnels 17 move to the right carrying the mica flakes to be deposited the various parts of the cementing device described above are as shown in Fig. 11, with spring 57 holding the cam 56 in a position to permit the valve 55 to close the orifices. Before the funnels reach the extreme right end of their travel, the roller 61 passes off the runway 62, but the orifices remain closed due to spring 57. The funnels then deposit their burden of mica, due to the automatic closure of damper 31, as above described. During the return motion of the funnel carriage the roller 61 mounts the runway 62 and the parts assume the position shown in Fig. 10 with cam portion 58 rotated against the action of spring 57 to raise valve lifter 55a permitting cementing material to fall upon the mica upon the conveyor. Near the extreme left end of travel of the funnels the roller passes off the runway and the valves 55 again close the orifices by the spring 57 turning the cam portion 58 about its pivot. The length of the runway is made adjustable to permit any desired duration of opening of the valves. Preferably the length of runway 62 is adjusted to deposit binding material upon only so much of the deposited mica as will be covered by the next succeeding mica layer. It is to be noted that the mica flakes are each time dropped upon binding material deposited during the previous return of the funnel carriage, the conveyor having advanced sufficiently during the cycle of movement of the funnels.

To distribute and compress the cementing material deposited by the cementing device above described, the conveyor 32 carrying a layer of mica flakes upon cementing material is made to pass under a weighted roller 63. Any suitable material may be used for roller 63 such as paper or felt.

The belt 32 carrying the layers of mica flakes and cementing material, after passing under the roller 63, enters the gas oven 2 in which it is subjected to indirect heating to dry the binder. The oven 2 is made sufficiently long to insure adequate drying of the binder. As shown in Fig. 6 the oven comprises a chamber 64 through which the conveyor passes and which is not exposed to the products of combustion, and a surrounding chamber 65 in which gas burners 66 are located. A manifold 67 preferably leads from the chamber 64 to a vapor condenser (not shown) to recover any products evaporated from the binder. A manifold 68 leading from the chamber 65 discharges the gases of combustion into the atmosphere. It is desirable to control the heat of the oven and for this purpose the oven is provided with suitable thermostats and gas pressure regulators. These have not been illustrated as they are well known and form no part of the present invention.

Upon leaving the oven, the conveyor passes around drum 52 while the produced mica board is wound on a drum 69 driven synchronously with drum 52 by means of a chain 70. After the removal of the mica board the belt 32 is cleaned by passing through a cleaning solution contained in a pan 71.

When it is desired to make the mica board upon a layer of paper or cloth, a roll of such material may be placed at 72 and allowed to unwind on top of belt 32 so that the mica flakes will be deposited thereupon. If it is desired to have a layer of cloth or paper upon the upper surface of the board as well, a second roll of such material may be placed at 72a and allowed to unwind on top of the deposited mica flakes and binder. Preferably material unwinding from roll 72a will be made to first pass through a container of binding material. This has not been illustrated, as obviously it may be readily accomplished by any suitable arrangement of rollers.

The above description of my machine is complete with the exception of the device for feeding mica flakes to the box 22 from which they are lifted by suction, and the means for the return of the excess mica in the box to the feeding device. Referring to Figs. 1, 2, 12 and 13, these parts comprise a hopper 73 into which the flakes are fed, an intermittently operated feeding device 74, the box 22 emptied by automatically operated dampers 75 and return pipe 76 through which the excess mica is returned to the hopper 73 by pressure from the blower 77. The feeding device 74 is driven by a motor 78 operating through the variable speed transmission 79 and chain 80. At 81 is diagrammatically indicated any suitable clutch device to be operated by the movement of the funnel carriage to disengage the feeding device 74 from its drive except while the funnels 17 are in their position of rest over the box 22. The speed of the device 74 is so adjusted that during each cycle of operation a quantity of mica flakes somewhat in excess of that needed to provide one layer upon the funnel screen is fed through the chute 82 and opening 83 (Fig. 12) into the box 22.

To provide a tight connection between the bottom of the funnels and box 22 the funnel carriage is arranged to descend over the box until the funnels are sealed by resting upon strips of flexible material such as felt, covering the edges of the box. This facilitates the lifting of the mica flakes by suction. The lowering of the funnel carriage is insured by providing a runway 84a with suitably cut grooves for each of the wheels 84 of the funnel carriage. The box 22, with its inlet opening 83 is also provided with an opening 85 (Fig. 13). Air entering through both of these openings, 83 and 85, creates a draft which is of great advantage in the proper distribution of the flakes upon the screen.

For the best operation of the machine I have found that it is important to completely clear the box 22 of the excess mica during each cycle of the funnel movement. In order to accomplish this, the bottom of the box 22 is closed by dampers 75 automatically operated by the movement of the funnel carriage. Arms 86 attached to dampers 75 are tripped by finger 87 attached to the funnel carriage. In Fig. 12 the finger 87 is shown as about to open a damper 75 by turning arm 86 against the tension of spring 86a which is attached at one end to the box 22 and at the other end to the arm 86. The dashed lines indicate the position of the arm 86 and damper 75 after the funnel carriage has moved further to the right. Conversely, Fig. 13 shows the finger 87 about to close a damper 75, the full lines indicating the open position of the damper 75 and arm 86, while the dashed lines indicate their position after movement of the funnel carriage to the left. It will be noted that doors 75 are closed only when the funnel carriage is over the mica box 22 in position to pick up a layer of mica flakes.

The excess mica emptied from the box 22 by the dampers 75 drops into troughs 88 and from there into the pipe 76 to be returned to the feeding device.

I have now described a complete machine for automatically producing a continuous length of mica board of any desired thickness. If the board is desired in short lengths, the apparatus of Figs. 14 and 15 may be substituted for the drum 69 of Figs. 1 and 2. This device comprises a cut-off knife 89 operating in guides 90 and controlled by cams 91 and a transfer means having fingers 92 for lifting the cut lengths of mica boards and depositing them on a receiver 93. The cams 91 are shaped to slowly raise and then release knife 89. They are driven synchronously with belt 32 by means of a chain 94. Endless belts 95, passing over pulleys 96, one set of which is driven in timed relation with the main machine by chains 97, receives the cut lengths of mica board. The fingers 92 of the transfer device are located between belts 95 and are rigidly attached to a shaft 98. The shaft 98 is driven by a weighted segmental gear 99, the teeth of which mesh with a second segmental gear 100, connected with the main drive of the machine through suitable chains 101 and gears 101a. A length of mica board, cut by knife 89 passes onto belts 95 and over fingers 92 until it reaches a stop 102 on the transfer device. Gears 99 and 100 are then in position to engage and rotate shaft 98 and fingers 92 to pick up the cut mica board and deposit it upon the receiver 93. Further rotation of gear 100 disengages its teeth with those of gear 99 and permits the weight of gear 99 to swing the fingers 92 back to their original position. The timing of these operations and length of fingers 92 are so adjusted that the fingers in returning to position between belts 95 clear the advancing edge of the next piece of mica board.

In order to make clear the operation of my machine as a whole I have described certain parts thereof in considerable detail. I do not wish, however, to be limited beyond the scope of the appended claims, as obviously many parts of the machine could be varied and certain parts added or omitted without departing from the spirit of my invention. I do not wish, for instance, to be limited to a single feeding mechanism, to a single suction mechanism, or to the particular suction and cement feeding control devices illustrated. It is not essential to my invention that the suction mechanism reciprocate parallel to the direction of travel of the conveyor, but only that it is arranged to lift mica flakes from the feeding device and deposit them upon the conveyor.

I claim:

1. In an automatic machine for making mica board, the combination comprising a feeding device for mica flakes, a continuously moving conveyor, a reciprocating device for lifting the mica flakes from said feeding device and depositing them on said conveyor, a device for depositing cementing material between successive deposits of mica on said conveyor, and interrelated driving means for said reciprocating device and said conveyor including a rack connected to said lifting and depositing means, a member rotated in timed relation with the conveyor drive, and means on said rack adapted to engage with said rotating member to cause said rack to reciprocate longitudinally with unidirectional rotation of said member.

2. In an automatic machine for making mica board, the combination comprising a feeding device for mica flakes, a continuously moving conveyor, a reciprocating device for lifting the mica flakes from said feeding device and depositing them on said conveyor, a device for depositing cementing material between successive deposits of mica on said conveyor, and interrelated driving means for said reciprocating device and said conveyor including a rack connected to said lifting and depositing means, a rotatable member connected through a clutch mechanism with the conveyor drive, coacting means on said rack and member to cause longitudinal reciprocation of said rack with unidirectional rotation of said member, and a cam for controlling the clutch mechanism shaped to arrest the rotation of said member during lifting of mica flakes from the feeding device.

3. In an automatic machine for making mica board, the combination comprising a feeding device for mica flakes, a continuously moving conveyor, a reciprocating device for lifting the mica flakes from said feeding device and depositing them on said conveyor, a device for depositing cementing material between successive deposits of mica on said conveyor, and interrelated driving means for said reciprocating device and said conveyor said device for depositing binding material being carried by said lifting and depositing means and being provided with valve controlled orifices adapted to be operated by the coaction of a member carried by said device with a stationary member on the framework of the machine.

4. In an automatic machine for making mica board, the combination comprising a feeding device for mica flakes including an intermittently operated power driven member and a box receiving mica flakes therefrom, a conveyor, means for successively lifting mica flakes from said box by suction and depositing them upon said conveyor, interrelated driving means for said lifting and deposition means and for said conveyor and means for depositing cementing material between successive deposits of mica upon said conveyor.

5. The combination as in claim 4 including means carried by the lifting and depositing means for emptying said box of excess mica after each lifting of mica flakes therefrom and means for returning the same to said power driven member of the feeding device.

6. In an automatic machine for making mica board, the combination comprising a feeding device for mica flakes, a continuously moving conveyor, a suction device including funnels and a screen carried by a carriage for lifting flakes from said feeding device onto the screen, for carrying the lifted flakes to a position over said conveyor and for depositing them thereupon, a damper for controlling the suction in said funnels, means normally tending to close the damper, stationary means adapted to hold the damper open against the last mentioned means when the suction device is in a position over the feeding device and to release the same upon movement of the suction device, latching means adapted to hold the damper at a partially open position upon release thereof by said stationary means and to release the damper at another position of said suction device.

7. The combination as in claim 6 wherein the controlling means for the damper include a weight connected to a projecting arm of the damper and tending to close the damper, a latch device carried by the damper comprising a horizontally projecting member and a vertically projecting member mounted on a common shaft, a stop attached to the damper casing adapted to engage the horizontally projecting member of said latch device to hold the damper partially open, a fixed stop adapted to engage the upwardly projecting member of said latch device at one extreme of travel of said carriage to rotate said projecting members and to thereby permit the weight to close the damper by the release of said horizontally projecting member, and another fixed stop adapted to engage the damper arm to open the damper against the pull of the weight at the other extreme of travel of the carriage.

8. An automatic machine for making mica board including in combination a feeding device for mica flakes, an endless conveyor, means for successively lifting mica flakes from said feeding device and depositing them upon said conveyor, a device for depositing cementing material between successive layers of mica upon said conveyor, an oven chamber heated by indirect heat and provided with openings at either end for the passage of the conveyor therethrough, receiving means for removing the produced mica board from the conveyor, and interrelated driving means for said conveyor, said lifting and depositing means and for said receiving means.

9. An automatic machine as claimed in claim 8 including also a weighted roller mounted on the framework of the machine in advance of the oven and adapted to bear upon the deposited layers of mica and cement to distribute the latter.

10. The combination as in claim 8 wherein said receiving means includes a vertically movable knife for cutting the produced mica board into given lengths, cams driven in timed relation to the conveyor drive for lifting said knife and permitting it to fall upon the mica board, a receiving table and means for transferring the cut mica board to said receiving table, said transfer means being rotatable by a segmental gear adapted to engage through a definite arc with a second segmental gear driven in timed relation with the conveyor drive, said first mentioned gear being so weighted as to return the transfer means through the definite arc when said gears are out of engagement.

11. In an automatic machine for making mica board, the combination comprising a feeding device for mica flakes, a continuously moving conveyor, a reciprocating device for lifting the mica flakes from said feeding device and depositing them on said conveyor, a device for depositing cementing material between successive deposits of mica on said conveyor, interrelated driving means for said reciprocating device and said conveyor, and a device for continuously feeding a suitable covering material for the mica board, said device moving at a rate of speed equal to the conveyor speed.

In testimony whereof, I have signed my name to this specification.

JOSEPH M. COFFEY.